Aug. 18, 1936.  E. J. PARDON ET AL  2,051,414
ROLLER SKATE
Filed June 29, 1935
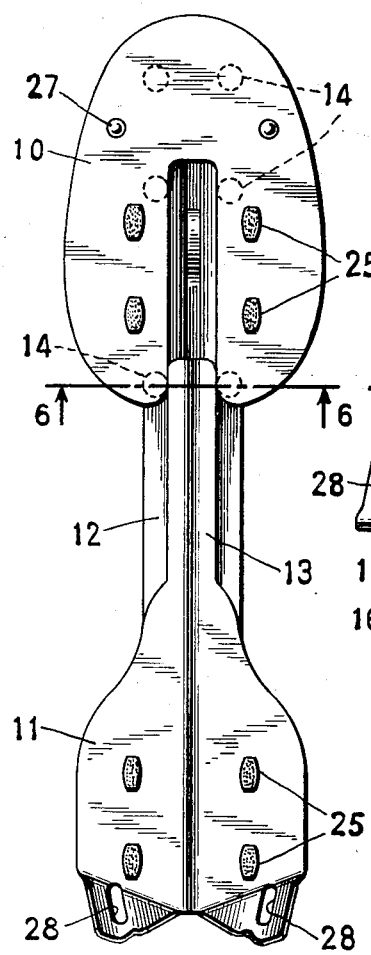
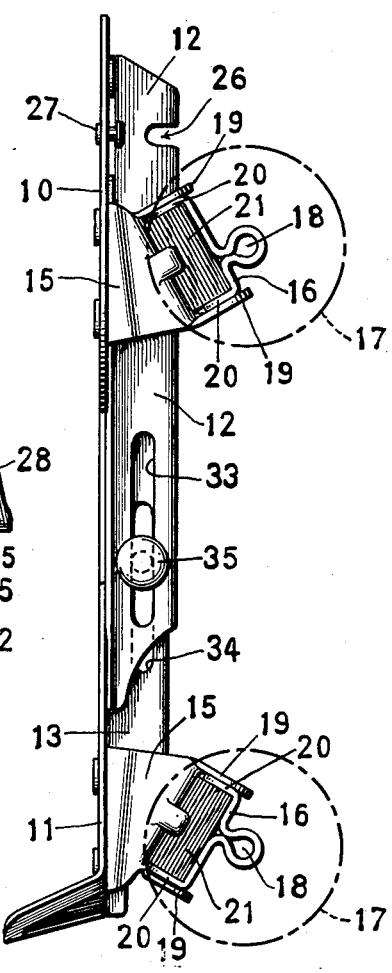
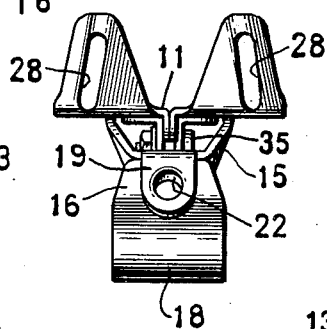
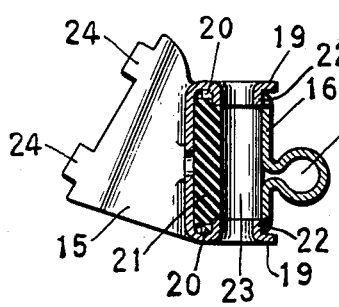
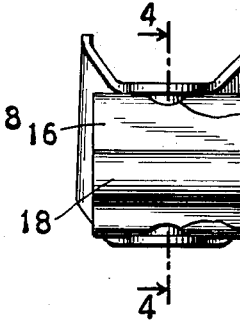
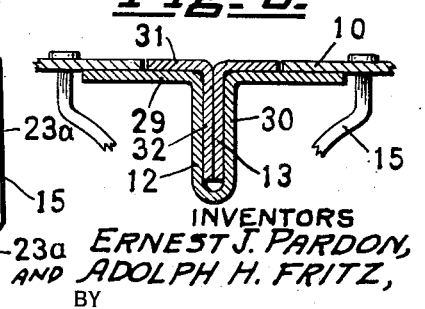
INVENTORS
ERNEST J. PARDON,
AND ADOLPH H. FRITZ,
BY
ATTORNEY Patented Aug. 18, 1936

2,051,414

UNITED STATES PATENT OFFICE 2,051,414

ROLLER SKATE

Ernest J. Pardon, Torrington, and Adolph H. Fritz, Litchfield, Conn., assignors to Union Hardware Company, Torrington, Conn., a corporation of Connecticut Application June 29, 1935, Serial No. 29,040

8 Claims. (Cl. 208—173)

This invention relates to roller skates and has for its object to strengthen such skates and at the same time simplify and cheapen their construction and reduce the number of parts.

Another object is to provide an extensible skate in which substantially no part of the top surface of the toe plate is recessed when the skate is closed for the smaller size foot and in which only a small area thereof is recessed when the skate is opened or extended to fit the larger size foot for which it is intended.

The truck and carrier construction is claimed in our application Serial Number 52,780 filed December 4, 1935.

Referring to the drawing

Fig. 1 is a top plan view of one embodiment of this invention.

Fig. 2 is a side view of the device of Fig. 1.

Fig. 3 is an end view of the device of Fig. 1 with the wheels and axles removed.

Fig. 4 shows the truck and carrier of this invention, the same being a section on the line 4—4 of Fig. 5.

Fig. 5 is a side view of the truck and carrier of Fig. 4.

Fig. 6 is a section on the line 6—6 of Fig. 1.

The toe plate 10 may be of the usual shape and arranged to be extensible with respect to the heel plate 11, by means of the substantially telescopic extensions 12 and 13 on the toe and heel plates respectively. The extension 12 is in Fig. 6 shown to be of generally T shaped cross section having the stem portion of the T double walled and arranged to receive the stem portion of the cooperating extension 13. The top or cross portion of the T shaped extension 12 is spot welded to the under surface of the toe plate 10 by the spot welds indicated at 14 by dotted lines.

A truck 15 is secured to each plate and has attached thereto a carrier 16 in the portion 18 of which is mounted an axle carrying the wheels 17 shown only in dotted lines.

Each truck has front and rear flanges 19 bent over to engage front and rear flanges 20 of the carrier. A resilient block of rubber or like material 21 is mounted between the truck and carrier for the usual purpose. Instead of trunnion pins extending through these flanges and the rubber block, an integral projection 22 is formed on each truck flange 19 by stamping or spinning so that this projection extends into the carrier flanges and into the rubber block as shown in Fig. 4.

The rubber block has a perforation 23 extending therethrough which is of assistance in inserting the necessary tool for forming the flanges or projections 22.

From Fig. 4 it will also be seen that each projection 22 extends for substantially 360° and is located below the top of the carrier. The perforation 23a in the carrier flanges 20 is adapted to receive the projection 22 and as shown in Fig. 4 this perforation in the carrier flanges 20 extends slightly beyond the base of the flanges into the body portion of the carrier as illustrated.

The trucks 15 are each provided with portions 24 which are adapted to extend through the heel or toe plate and be headed over or riveted over, with their top surface roughened as indicated at 25. The recess 26 in the extension 12 is adapted to receive the threaded member of the usual shoe clamping device, the clamping portions of which slide about the rivets or guides 27. A strap around the instep is adapted to be secured through the perforations 28 in the rear of the heel plate.

The upper or cross portion 29 of the extension 12 is adapted to assist in supporting the corresponding portion 31 of the extension 13 which is substantially nested therein with the stem or vertical portion 30 of the extension 12 enclosing the corresponding portion 32 of extension 13.

The extension 12 thus supports, clamps and stiffens the cooperating extension 13 so that the extension 13 is contiguous the extension 12 on both the right and left sides of its cross portion and on both sides of the stem part of the extension 13. The toe plate 10 is recessed as shown in Fig. 1 to receive the top or cross portion of the extension 13 with the side edges of said recess lying substantially contiguous the side edges of the top or cross portion of the extension 13.

With the heel and toe plate moved together so that the skate is adapted to fit the smallest size shoe intended, the extension 13 substantially fills the recess in the toe plate with the result that there is substantially no recessed portion of the toe plate into which the shoe sole may be bent or flexed. When the heel and toe plates are pulled apart so that the skate is adapted to fit the largest size shoe intended, the recess in the toe plate is comparatively small when regard is had to numerous prior art suggestions.

The stem of each extension 12 and 13 is provided with an elongated slot 33 and 34 respectively and a bolt 35 passes through these slots so that it may clamp the extensions 12 and 13 in any position of adjustment. Having each extension member longitudinally slotted permits a wide range of extensibility without having any one extension member slotted the full length of such extensibility.

The extensions 12 and 13 being T shaped in cross section are readily adapted to reenforce the skate and plates against the usual sort of stresses encountered, such as flexure and torsion in various directions.

The top or cross section of the extension 12 is located in an out of the way position on the underside of the toe plate and between the sides of the truck supporting portions. The extension 13 is illustrated as being formed integrally with the heel plate 11, the sides of the extension stem portion being doubled and lying substantially contiguous one another as shown in Fig. 6.

Having the projections 22 formed integrally on the truck flanges enables the carrier to be securely attached without the use of a trunnion pin and yet at the same time provides a large bearing surface between the projection 22 and the carrier flanges 20. In order that the bearing surface for the flange 22 may be large the rubber blocks 21 are thicker than usual. The nesting and substantial telescoping of the interfitting extensions 12 and 13 is worthy of mention inasmuch as each extension is so shaped as to enhance its strength.

The stem parts 32 of the extension 13 are preferably spot welded together. These stem parts may be formed as illustrated in the drawing or they may be connected at the bottom by forming both parts of the heel plate from a single sheet.

We claim:

1. An extensible skate comprising heel and toe plates, a truck, carrier, and wheels secured to each plate, telescopic extensions secured to said plates, and a bolt for holding said extensions in adjusted position, each extension being of T shape with the stem thereof having about double the wall thickness of the cross portion, one extension having the cross portion thereof substantially flush with the top surface of one of said plates and the other extension having its cross portion rigidly secured to the lower surface of the other plate.

2. An extensible skate comprising heel and toe plates, a truck, carrier, and wheels secured to each plate, telescopic extensions secured to said plates, and a bolt for holding said extensions in adjusted position, each extension being of T shape with the stem thereof having about double the wall thickness of the cross portion, one extension having the cross portion thereof substantially flush with the top surface of one of said plates and the other extension having its cross portion rigidly secured to the lower surface of the other plate, the stem of each extension being provided with an elongated recess and said bolt projecting through said recesses and clamping the stem portion of the rigidly secured extension contiguous opposite sides of the stem portion of the other extension.

3. An extensible skate comprising heel and toe plates, a truck, a carrier, and wheels secured to each plate, telescopic extensions secured to said plates, and a bolt for holding said extensions in adjusted position, each truck having prongs extending through its plate and riveted over, each extension being of T shape, one extension being rigidly secured to the lower surface of one plate and the other extension being integral with the other plate, said integral extension being received on and within the other extension and a bolt through the stem of each extension for clamping them together, the plate to which one extension is secured being recessed to receive the upper portion of the other extension with the top surface of said other extension substantially flush with the top surface of the other plate.

4. A roller skate of the extensible type including heel and toe plates having interfitting and adjustable extensions extending from each plate toward the other, the toe plate extension being secured to the underside of the toe plate and of T shaped cross section with the sides of the stem of the T spaced apart, the heel plate extension being integral therewith and also of T shaped cross section with the top of said T adapted to rest on top of the T of the toe plate extension and the stem of the heel plate extension adapted to be clamped between the sides of the stem of the toe plate extension, the stem of the heel plate extension extending rearwardly beneath the heel plate and both the top and stem portions of said heel plate extension being integral with and constituting portions of the heel plate.

5. A skate frame comprising heel and toe plates, the heel plate being formed of two portions, each portion having an extension projecting forwardly into the toe plate and each having an integral, downwardly projecting flange secured to the flange of the other portion, the toe plate being formed of one piece with a slot to receive the forwardly extending parts of the heel plate, a channel member forming a guide for the downwardly projecting flanges of the heel plate and itself having laterally extending flanges secured to the bottom of the toe plate alongside of said slot, and truck members having side flanges secured to the opposite sides respectively of the toe and heel plates and serving to laterally reenforce said plates.

6. An extensible skate frame comprising toe and heel plates, at least one of said plates being formed of two separate parts and each having a downwardly extending flange extending beneath the other plate, a channel like member having flanges secured to the latter plate and extending beneath the first mentioned plate, a clamping member connecting the flanges which are secured to their respective plates, and truck members having side flanges secured to the opposite sides of the respective plates.

7. An extensible skate having heel and toe plates with integral portions of each telescoping with portions of the other in a common plane, each plate having two depending flanges, the flanges of one plate being secured together and the flanges of the other plate slidably embracing the sides of the first mentioned flanges, means for clamping the said flanges together to hold the parts in adjusted positions, and truck carriers having side flanges secured to the plates on opposite sides of their respective flanges.

8. A skate frame comprising heel and toe plates, one plate being formed of two portions, each portion having an extension projecting forwardly into the other plate and each having a downwardly projecting flange secured to the flange of the other portion, the second mentioned plate being formed of one piece with a slot to receive the forwardly extending parts of the other plate, a channel member forming a guide for the downwardly projecting flanges of the first mentioned plate and itself having laterally extending flanges secured to the bottom of the other plate alongside of said slot, and truck members having side flanges secured to the opposite sides respectively of the toe and heel plates and serving to laterally reenforce said plates.

ERNEST J. PARDON.
ADOLPH H. FRITZ.